Sept. 5, 1967  P. J. SNYDER  3,339,379
UNIVERSAL COUPLING SYSTEM AND THE LIKE
Filed Sept. 14, 1965
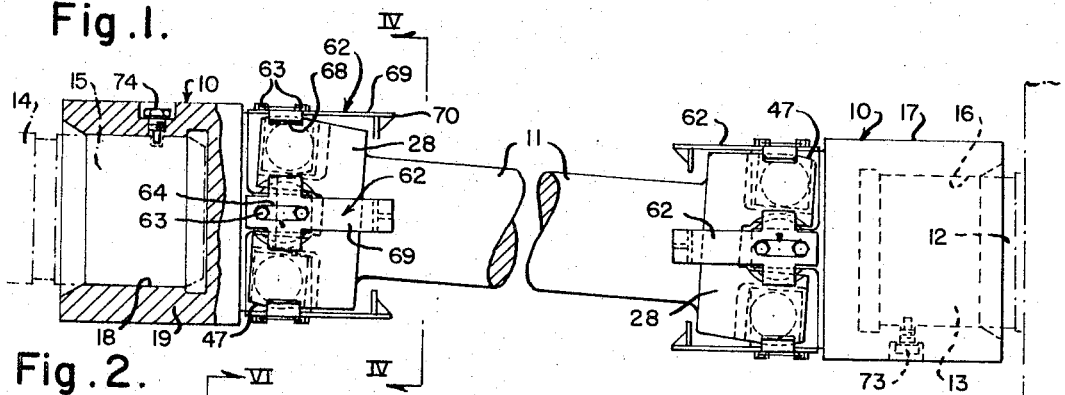
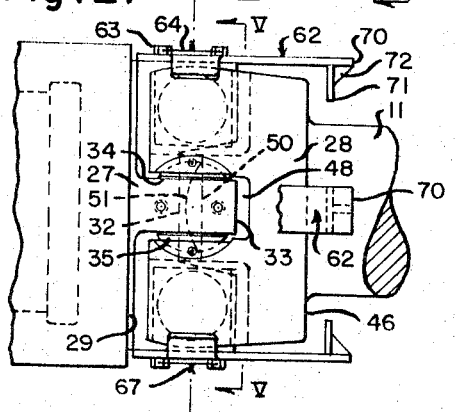
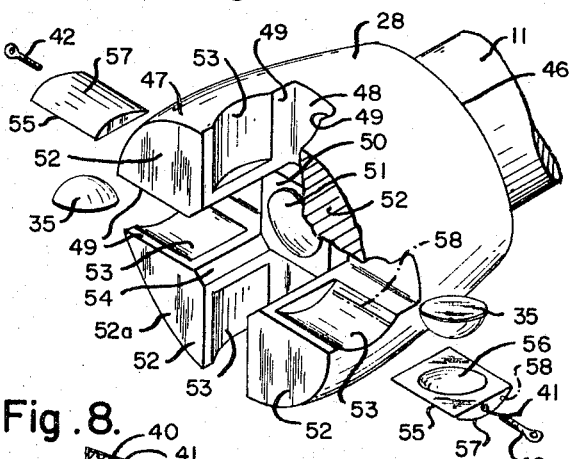
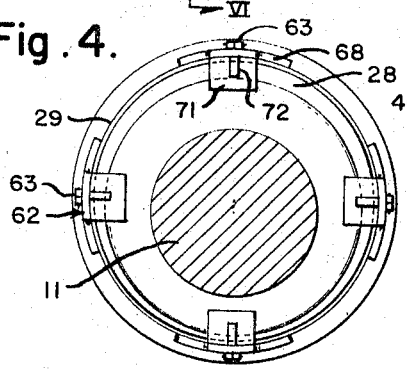
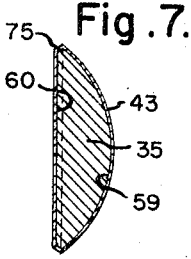
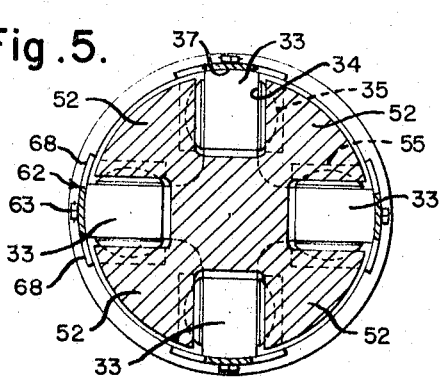
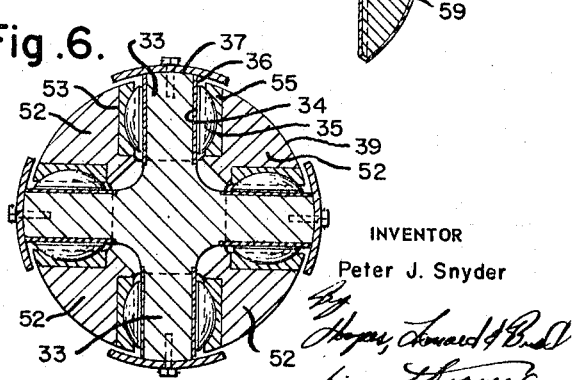
INVENTOR
Peter J. Snyder United States Patent Office 3,339,379
Patented Sept. 5, 1967

3,339,379
UNIVERSAL COUPLING SYSTEM
AND THE LIKE
Peter J. Snyder, 6723 Smithfield St.,
McKeesport, Pa. 15135
Filed Sept. 14, 1965, Ser. No. 487,234
8 Claims. (Cl. 64—7)

This invention relates to universal coupling devices, universal coupling and spindle arrangements, and the like. More particularly, the invention pertains to rugged, long-lived, self-lubricating and troublefree universal couplings, used for example in metal rolling mills, tube mills, related and associated equipment in which the axis of the driven shaft or shafts is not usually or necessarily coincident with the axis of the driving shaft or shafts.

The present invention is an improvement upon the universal spindle coupling described and claimed in my copending application S.N. 304,416, filed Aug. 26, 1963, now Patent No. 3,205,680.

Current universal spindle coupling devices principally in mill use are generally of the slipper or gear types. Slipper types require very precise machining, tend to be asymmetrical in operation, give rise to lubricating difficulties, in the course of use often tend to be subject to objectionable pressures at the corners of the slippers and to incur undue wear and slipper breakage. Gear type couplings, on the other hand, are very expensive even when the teeth on the coupling are crowned along their respective longitudinal ridges and flanks; such gear type couplings also tend to require extreme operating precision in use and to be relatively easily damaged with resultant expense of significant magnitude. Usually such devices required the use of sealed lubricating systems the seals of which are comparatively short-lived as a result of undue flexure stresses imposed by the angular or non-aligned disposition of the input and output shafts associated with the couplings. Moreover, component parts of the coupling which were subjected to the greatest wearing forces, such as bearings, either were non-replaceable resulting in disposal of the entire coupling, or could be replaced only by disassembling the coupling or a major proportion thereof, with attendant expenditure of time and labor.

Shortcomings of such prior kinds of couplings will be overcome by devices made in accordance with my invention. Therein, turning forces irrespective of the angulation of the axes of the cooperating heads of a coupling are symmetrically applied through metal sections in the respective heads which preferably withstand shear forces equally well. The coupling is made self-lubricating so that in all angular positions of one component of the coupling relative to the other, there is permanently lubricated surface engagement of the pressure-transmitting parts. Such wear as occurs is on readily replaceable pressure or bearing members which transmit rotational forces uniformly with minimal wear and with dynamic balance, whether or not the universal spindle coupling of this invention is used on reversing or non-reversing mills and whether or not speed changes are encountered in the course of operation. Further, detrimental stresses between shafts are held to a minimum because of the substantial absence of whiplash effect and play. A small clearance insufficient for play is built into devices of this invention to accommodate any tendency to secanting caused by axial displacement of bearing parts in the course of rotation with the respective rotational axes of the coupling heads at an angle. The replaceable and self-lubricating bearing structure of my present invention are disposed for ready accessibility and replacement with a minimum expenditure of time and labor. By incorporating the aforementioned self-lubricating feature, replacement of the bearing members of my coupling is further facilitated by obviating the necessity of a sealed relatively short-lived fluid lubricating system. A readily detached bearing member retaining structure forming part of my novel coupling in addition serves to retain the components thereof in their coupled positions to avoid displacement or disassembly thereof relative to their operating position when the bearing members are removed for re-lubrication or other maintenance or for replacement.

These and other objects, features and advantages of this invention together with constructional details thereof will be elaborated upon during the following description and the accompanying drawings, which are illustrative only, in which FIGURE 1 is a elevational view, partly in cross-section, of a rotational force transmitting spindle for a rolling mill or the like with the spindle being disposed at an angle relative to the axes of input and output shafts and having one embodiment of my coupling device at each end thereof;

FIGURE 2 is an enlarged detailed view, partially in section, of the coupling shown at the mill or output end, with however, the spindle and output shaft axes being coincident to illustrate another possible position of the coupling member;

FIGURE 3 is an exploded, somewhat enlarged, isometric view of the coupling drive and bearing components, and illustrating one means for facilitating withdrawal of the bearing members therefrom;

FIGURE 4 is a cross-sectional view of the apparatus illustrated in FIGURE 1 and taken generally along reference line IV—IV thereof;

FIGURE 5 is a cross-sectional view of the output coupling arrangement illustrated in FIGURE 1 and taken generally along reference line V—V of FIGURE 2;

FIGURE 6 is a cross-sectional view of the output coupling shown in FIGURE 2 and taken generally along reference line VI—VI thereof;

FIGURE 7 is an enlarged cross-sectional view of one of the cooperating bearing members of the bearing assemblies utilized in connection with the coupling arrangement of the preceding figures; and FIGURE 8 is an enlarged cross-sectional view of the other cooperating bearing member of each bearing assembly employed in the aforesaid coupling.

Referring to the drawings, a universal spindle coupling 10 is illustrated at each end of a driving spindle 11 used in, for example, a rolling mill to transmit power between a driving pinion shaft 12 having a necked end 13 and a roll 14 having a necked end 15. There may be two spindles one above the other, with either or both at some angle to the respective axes of rotation of the driving and driven shafts respectively. Generally in the service illustrated, the axes of the members 11, 12 and 14 will be in the same vertical plane, but such is not necessarily the case as in the event of shafts whose axes also may have a horizontal component of displacement to be rotationally connected by a spindle such as spindle 11. Each coupling 10 is a mirror image of the other, but such is not essential in that they may be similarly positioned at each end of spindle 11, somewhat better balance being obtainable when connected as shown in FIGURE 1. The neck 13 of driving shaft 12 is non-circular and fits in a correspondingly shaped recess 16 in an adaptor 17. Likewise, neck 15 of driven shaft 14 is non-circular in cross section to fit into a correspondingly shaped recess 18 in a driven adapter 19.

In this arrangement, the couplings 10 are disposed allochirally as aforesaid, and each comprises a head 27 which may be an integral part of adapters 17 and 19 and, a cooperating head 28 fixed by welding or otherwise to spindle 11 in that same embodiment. Head 28 is the one which in a particular operation of such embodiment has a rotational path about the axis of spindle 11 at an angle to the rotation of head 27 about the horizontal axis of shaft 14 in one of the couplings 10. The rotation of head 27 in the other coupling 10 at the lower end of spindle 11 is about the horizontal axis of shaft 12. Head 27 has a peripheral base 29 and a setback center surface 32 at right angles to the axis of rotation of head 27 and integral fingers or ribs 33 which extend radially to the perimeter of the base 29. Such ribs 33 are generally rectangular in cross section normal to the axis of head 27 and also generally rectangular in end view (see FIGURE 5). Such ribs 33 are uniformly angularly spaced from each other about such center and are four in number, although a number preferably greater than two can be used.

The sides 34 of each rib 33 face outwardly and comprise face surfaces on which the flat portion of spherical bearing segments 35 are adapted to bear and slide depending upon the direction of rotation in the course of a force transmitting rotational action. Such faces 34 desirably are surface with wear resistant plates 36 held to the stock of the ribs 33 by screws or bolts whose heads do not project above the surface of such wear plates. Each face 34 is opposite to a corresponding face on head 28 on the other side of the spherical bearing segment 35 between them. The preipheral surface 37 of each rib 33 is arcuate to conform to the outer arcuate periphery 39 of the head 28 and inclined end 40 of bearing pad or holder 55, described below.

Head 28 flares outwardly from its base 46 which base can be fitted over a reduced portion of the adjoining end of spindle 11 and be welded thereto. The outer end portion 47 of the preiphery of head 28 preferably is longitudinally arcuate. The outer end 52a of head 28 is planar at right angles to its axis of rotation in the same manner that the outer end 33 of head 27 is planar to its axis of rotation. Head 28 is provided with radial channels 48 extending from its outer end 52a toward base 46 with opposed sides 49 facing one another in each channel. Head 28 also has a setback center 50 on which a convex bumper 51 is affixed by welding or otherwise. The stock of head 28 between channels 48 comprises a number of fingers or sectors 52 which are sector-like in end view and adapted to extend into the sector-like spaces between the fingers or ribs 33, of head 27, there being the same plurality of sectors 52 that there are ribs 33. When in axial overlapping position, rotational movement is possible by the heads 27 and 28 each about its own axis of rotation and there is interfitting in which the axial overlap of the respective ribs 33 and sectors 52 can take place in the course of use at either end of spindle 11 until center 32 nearly abuts bumper 51 as shown in FIGURE 2. Normally the operating position of the couplings 10 and of spindle 11 relative to the shafts 12 and 14 is such that the couplings cannot axially be displaced sufficiently to become disengaged, nor are both bumpers 51 in engagement with the respective centers 32 at one and the same time. In general, with the angle shown in FIGURE 1, the lower bumper 51 will tend to be the one more or less close to or in engagement with the respective center 32 at that end.

The cross-sectional area normal to the axis of rotation of the sectors 52 preferably approximates the aggregate cross-sectional area of the ribs 33 in a plane normal to their axis of rotation, for relatively equivalent strength in shear and uniform transmission of high pressure rotational forces through such respective heads usually at an angle to each other in each coupling 10. Further, the sides 49 in each channel 48 comprise opposed faces 49 in the illustrated embodiment which preferably are provided with cylindrical depressions 53 extending transversely and radially inwardly from the periphery of sectors 52 terminating outwardly of the inner chamfered corner 54 of the respective sectors 52. Such depressions 53 are bored about an axis normal to and intersecting the axis of rotation of head 28 and midway between the faces 49, such bored axis being parallel to the faces 49.

Each depression 53 is adapted to receive a cylindrical segment in the form of a bearing pad or holder 55 having a spherical socket 56 in the outer face thereof to accommodate the spherical surface of the aforementioned bearing segment 35. The opposite surface 57 of each pad 55 is cylindrical for surface engagement with the cylindrical depression 53. If desired, a keyway 58 may be provided in depression 53 and the cylindrical side of pad 55 for a complementarily shaped key to keep pad 55 in its respective depression during use without any tilting or rocking about the axis of the bores 53 and with the outer flat surface flush with the faces 49. Generally, such keying would not be required in many applications inasmuch as the pads 55 tend to substantially maintain such position in use. The pads 55, like spherical bearing segments 35, desirably are made of a specially hardened material such as stellite, which when treated as described hereinafter afford excellent antifrictional surfaces. For ready replacement, as and when such replacement is desired, the bearing holders or pads 55 are each provided with a tapped aperture 41 into which an eye-bolt 42 or the like can be threaded when needed for withdrawing the pad 55 from the associated depression 53, as better shown in FIGURE 3. As better shown in FIGURES 7 and 8, to facilitate insertion and withdrawal of the assembled bearing members 35, 55 relative to the coupling 10, the bearing segment 35 is provided with a chamfer 75 extending peripherally around its flat side 60. For the same purpose, the bearing pad 55 is provided with a chamfer 76 at the junction between its leading or inserted end 77 and its cylindrical surface 57.

Spherical bearing segments 35 each have a spherical surface 59 and a flat surface 60 respectively adapted to engage the spherical socket 56 and adjoining face of rib 33 when coupling 10 is in assembled relation. The center of the sphere represented by the spherical surfaces of a pair of sockets 56 is the pads 55 on opposite sides of a rib 33 desirably is on the same axis as the axis of the cylindrical bores 53 on opposite sides of the same rib 33. The segments 35 and bearing pads 55 substantially occupy the entire space between the opposed faces of sectors and ribs on opposite sides of each of the ribs 33 except for a small aggregate clearance required by any secant action in the course of use. Such small clearances are too minute to permit any detrimental play in use, or any backlash or whiplash, and are usually less than five one-thousandths of one inch in the course of normal angulation for a rolling mill spindle coupling having a maximum angle of adjustment of about 4° above or below a horizontal axis position. The curvature of the spherical surface of each bearing segment 35 is the same for all practical purposes as the radius of curvature of each socket 56.

In this arrangement of the coupling 10, the bearing segments 35 and the bearing pads 55, and particularly the engaging spherical surfaces thereof, are pre-treated as will now be described in order to afford dry lubrication thereof. This is accomplished by imparting films 43 and 44 of dry lubricant to the surfaces of the bearing segments 35 and their pads 55, as better shown in FIGURES 7 and 8 of the drawings.

In this arrangement of the invention, the dry lubricant coatings are applied, in accord with known coating techniques, to each bearing assembly 35, 55 by coating, for example, with a mixture of pulverulent molybdenum sulfide or a combination of about 90% molybdenum sulfide and 10% graphite by weight with an epoxy resin binding agent. The mixture can be coated on the surfaces of the bearing assembly 35, 55 (after suitable surface pretreatment such as degreasing and sandblasting) as by painting or spraying or by other suitable methods, before the resin has set-up. The bearing members 35 and their pads 55 are then heated or baked in an oven at a temperature of about 375° F. for about one hour to cure the coated mixture whereupon it becomes thoroughly dried and bonded to the bearing members. It has been found that the dry lubricant films or coatings 43, 44 produced in this manner have a lower frictional co-efficient than that of typical oil films and will withstand in the neighborhood of 10 times the unit pressure that can be applied to such oil films without fretting or galling the bearing surfaces. If desired, the above-described dry lubricant coatings can be applied also to the cylindrical surfaces 53 and the wear resistant plates 36.

In the coupling arrangement as described thus far, it will be apparent that there is dynamic balance of the universal spindle coupling irrespective of the direction of rotation since the device is reversible in that respect (although a one-way embodiment may be provided instead). Moreover, when in the course of rotation of head 28 adjoining sectors 52 "pivot" about a transverse axis relative to the ribs 33 spanned by the channel between such sectors (see FIGURE 2), there is a tendency for the spanned bearing segments 35 to be axially displaced minutely in the direction of the small arrows shown in FIGURE 2, the small secant clearance comes into operation to tolerate the additional separation that may arise between centers of the segments 35 by virtue of such minute axial displacement therebetween. However, when the central axes of the two bearing segments 35 on opposite sides of a rib 33 are coincident, the distance between them will tend to be minutely farther than when their respective axes are so minutely displaced from one another, as occasioned during each revolution by the rotation of the two heads in a coupling 10 about different axes of rotation. At the same time, the spherical surface 59 of each segment 35 remains in surface engagement with its socket 56 and in turn in surface engagement with the surface of depression 53 due to the cylindrical surface 57 of pad 55.

When the surfaces of the bearing segments 35 and of the bearing pads 55, particularly the engaged spherical surfaces 59 and 56 thereof respectively, become unduly worn or when it is desired to restore the self-lubricating coatings 43 and 44 thereof, means are provided in accordance with the invention for releasably retaining the bearing segments 35 and the associated bearing pads 55 within the coupling 10. Desirably, means are also incorporated with the bearing retaining means for loosely retaining the head portions 27 and 28 in engagement, when the bearing segments and pads have been withdrawn in order to facilitate re-assembly of the coupling with either relubricated or replacement bearing members 35 or 55, or both.

As seen in FIGURES 1 to 6 of the drawings, such bearing retaining means includes a generally cruciform bracket or retaining member 62 secured to the outer circumference of certain ones of the fingers 33 and 52, for example to each of the ribs or fingers 33 as by mounting bolts 63. To prevent inadvertent release of the retaining members 62 and loss of the associated bearing members 35, 55, a pair of mounting bolts 63 are used for each retaining member or bracket 62 and a wire 64 is inserted through apertures in the associated bolt heads respectively and twisted at 67 to prevent turning and loosening of the bolts 63.

The retaining member includes a pair of overlying wing portions or transversely extending arms 68, which, as better shown in FIGURE 5 cover the outward openings of the cylindrical depressions 53 to prevent withdrawal of the bearing pads 55 and the bearing members 35 engaged therewith. Each of the bearing retainers 62 is fabricated from a structural material such as carbon steel of sufficient thickness and strength to retain the bearing members 35, 55 against the centrifugal forces induced upon rotation of the coupling 10. However, when it is desired to remove any of the bearing members 35, 55 for maintenance or replacement thereof, this can be accomplished quickly and easily by the simple removal of the associated headed mounting bolts 63, after first snipping their retaining wire 64. This operation permits removal of either or both of the bearing assemblies 35, 55 associated with each of the ribs 33 for inspection.

Usually only one of the retainers 62 need be removed and the pair of associated bearings 35, 55 are pulled out for inspection. The condition of the thus extracted bearing assemblies 35, 55 would indicate a like condition for the rest of the bearing assemblies remaining in the coupling assembly. Therefore, all of the bearing assemblies usually will be recoated or replaced at the same time, when the need is indicated by the aforementioned inspection, to afford predictable control over the life of the bearing surfaces or of their dry lubricant coatings 43, 44 (FIGURES 7 and 8).

Each of the bearing retaining brackets 62 is further provided with a longitudinally extending and elongated leg portion 69 provided adjacent its free end 70 with a depending or inwardly extending tab 71 (relative to the axis of rotation). The depending tabs 71, which in this example are reinforced by gussets 72 are thus disposed to engage the base portion 46 of the spindle head 28 to prevent withdrawal thereof or separation of the heads 27 and 28, when the bearing brackets 62 are secured in place. Accordingly, when the spindle and coupling assembly 10, 11 is released from the input and output shafts 12, 14, as by loosening set screws 73 and 74 respectively, the depending tabs 71 engage the peripheral base 46 of the coupling head 28 to maintain the spindle 11 and the couplings 10 at each end thereof together, and particularly to maintain the heads 27 and 28 of the couplings 10 against separation thereof. This feature is, of course, operative in other applications of my invention, for example, where only one such coupling 10 is employed and the spindle 11 is replaced by an input or output shaft (not shown) as the case may be. The latter shaft can, of course, be axially misaligned, relative to the other coupling shaft, for example in the manner as illustrated in connection with spindle 11 in FIGURE 1. As pointed out previously, the output shaft 14 is usually the neck of a mill roll (not shown) or the like which would require relatively frequent changing or replacement in this application of the invention.

On the other hand, the coupling 10 can be removed from its associated shafts or spindle 11 as the case may be for replacement or maintenance of its bearings 35, 55. Following removal of the bearings, one or more of the bearing retaining brackets 62 can be replaced on the coupling assembly 10 to retain the head portions 27 and 28 together, in order to avoid loss or misplacement thereof. As better shown in FIGURE 3, following removal of the bearing retaining brackets 62, the bearing pads 55 can be readily withdrawn from the coupling 10 by threadedly engaging the eye-bolts 42 or the like into the threaded apertures drilled and tapped respectively in the bearing pads 55. When thus assembled, the eye-bolts 42 can be grasped by the fingers or by a suitable tool to withdraw the bearing pads 55 together with the spherical bearing segments 35 located therein.

With my novel coupling 10, particularly when used with the spindle 11, the bearing assemblies 35, 55 can be readily removed from the couplings 10 for periodic inspection purposes or four routine replacement, without the use of an overhead crane or the like for dismantling the entire spindle and coupling arrangement for replacement of worn bearings. Moreover, the sealed lubricating system required in many coupling arrangments and applications, is obviated by the self-lubricating bearing assembly of my coupling.

From the foregoing, therefore, it will be apparent that novel and efficient forms of my coupling have been disclosed herein. Various changes may be made in details of the illustrated coupling arrangement; for example, consonant with the forces involved, the number of axial projections 33 and 52 on each cooperating head can be made either more or less than four in number, with a corresponding increase or decrease in the number of bearing assemblies 53, 55.

Other embodiments of this invention may be provided without departing from the spirit of this invention or from the scope of the appended claims.

I claim:

1. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, a bearing assembly slidably engaging each surface of each pair of said radially juxtaposed surfaces, and a number of bearing assembly retaining brackets secured respectively to the outward circumferential surfaces of some of said fingers, said retaining brackets overlying but spaced from the associated outward openings of said spaces to retain said bearing assemblies therein.

2. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, bearing assemblies slidably engaged between said radially juxtaposed surfaces, a like plurality of bearing assembly retaining brackets secured respectively to the outward circumferential surfaces of the fingers of one of said members, said retaining brackets overlying the associated outward openings of said spaces to retain said bearing assemblies therein, at least one of said retaining brackets having an axially extending leg member overlying the other of said head members, and an inwardly extending tab secured to said leg member adjacent the end thereof engageable with a base portion of said other head member to prevent separation of said head members.

3. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, bearing assemblies slidably engaged between said radially juxtaposed surfaces, and a like plurality of bearing assembly retaining brackets secured respectively to the outward circumferential surfaces of the fingers of one of said members, said retaining brackets overlying the associated outward openings of said spaces to retain said bearing assemblies therein, each of said retaining brackets having an axially extending leg member overlying the other of said head members, an inwardly extending tab secured to each of said leg member adjacent the end thereof and engageable with a base portion of said other head member to prevent separation of said head members, said tab being spaced inwardly from said leg member ends, and a reinforcing gusset secured to each of said leg member ends and to the associated tab.

4. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, bearing assemblies slidably engaged between said radially juxtaposed surfaces, a like plurality of cruciform bearing retaining members secured respectively to the fingers of one of said head members and positioned so that one pair of opposed arms of each of said cruciform members overlie respectively the openings of adjacent spaces between said fingers, each of said retaining means in addition having an elongated leg portion extending axially of said coupling and overlying the other of said head members, and inwardly extending tabs secured respectively to said leg members adjacent the free ends thereof, said tabs being engageable with said base portion of said other head member to prevent separation of said head members.

5. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, bearing assemblies slidably engaged between said radially juxtaposed surfaces, and a number of bearing assembly retaining brackets secured respectively to the outward circumferential surfaces of some of said fingers, said retaining brackets overlying the associated outward openings of said spaces to retain said bearing assemblies therein each of said bearing assemblies including a bearing pad and a cooperating bearing segment mounted therein for anti-frictional engagement therebetween, the non-engaged outer surfaces of each of said pads and of said segments respectively and slidably engaging the associated juxtaposed surfaces of said fingers.

6. The combination according to claim 5 characterized further in that a dry lubricant coating is adhered to at least the engaging surfaces of each of said pads and of said segments.

7. The combination according to claim 5 characterized further in that means are coupled to at least one of the pad and segment of each bearing assembly for withdrawing said assembly when the associated retaining bracket is removed.

8. In a universal coupling and the like, the combination comprising a head member having a plurality of axially extending and angularly spaced fingers, a cooperating head member having a like plurality of axially extending and angularly spaced fingers, said fingers being interfitted and uniformly spaced about the axes of their respective heads in axially overlapping relationship, said fingers respectively having their radially juxtaposed surfaces respectively spaced apart, bearing assemblies slidably engaged between said radially juxtaposed surfaces, a like plurality of cruciform bearing retaining members secured respectively to the fingers of one of said head members and positioned so that a pair of opposed arms of each of said cruciform members overlie respectively the openings of adjacent spaces between said fingers and an elongated leg portion of each of said cruciform members extends axially of said coupling and overlies the other of said head members, inwardly extending tabs secured respectively to said leg members adjacent the free ends thereof, said tabs being engageable with said base portion of the other of said head members to prevent separation of said head members, each of said bearing assemblies including a bearing pad having a spherical recess therein and a bearing segment having a cooperating spherical surface seated complementarily in said recess, the other non-engaged surfaces of said pad and said segment respectively engaging the juxtaposed surfaces of said fingers at the associated one of said spaces therebetween, a dry lubricant coating adhered at least to the engaged spherical surfaces of said pad and said segment, and means coupled to each of said bearing pads for withdrawing said bearing assemblies from said spaces when said retaining brackets are removed.

References Cited

UNITED STATES PATENTS

| | | | |
|---|---|---|---|
| 1,271,905 | 7/1918 | Jones | 64—6 |
| 1,316,733 | 9/1919 | McGee | 64—6 |
| 2,324,700 | 7/1943 | Healy | 64—7 |
| 2,532,433 | 12/1950 | Wingquist | 64—21 |

FOREIGN PATENTS 377,454  7/1932  Great Britain.

FRED C. MATTERN, Jr., *Primary Examiner.*

H. C. COE, *Assistant Examiner.*